Patented Nov. 26, 1940

2,223,142

UNITED STATES PATENT OFFICE 2,223,142

FUNGICIDAL PREPARATION

Clarence L. Weirich, Westport, Conn., assignor to The C. B. Dolge Company, Westport, Conn., a corporation of Connecticut No Drawing. Application July 11, 1938, Serial No. 218,670

4 Claims. (Cl. 167—58)

The present invention relates to improvements in fungicidal compositions which are useful in the prophylaxis of skin infections or skin diseases caused by fungi, particularly the skin disease popularly known as "athlete's foot."

In addition, the present invention relates to process for disinfecting the feet in the prophylaxis of athlete's foot.

I have found that para-nitrophenol can be enhanced in fungicidal powers or properties by mixing it with a water soluble inorganic salt which does not chemically react with the para-nitrophenol; and that mixtures so formed, when dissolved in water and applied to the feet, are very effective in the prophylaxis of athlete's foot.

As examples of the said water soluble inorganic salt which may be employed in admixture with para-nitrophenol, I mention sodium chloride, potassium chloride, magnesium sulphate, zinc chloride, ammonium chloride, calcium chloride, sodium sulphate, and sodium thiosulphate.

In preparing the compositions for use, I first mix the para-nitrophenol and the salt together in such proportions that the proportion of the salt in the mixture greatly exceeds the proportion of the para-nitrophenol therein. I have found that nine or more parts by weight of the salt to one part by weight of the para-nitrophenol accomplish satisfactory results, although I do not confine myself to these proportions. The so prepared mixture is then dissolved in water in such proportion as to provide a solution having a concentration of at least two and one-half per cent of the salt. However, in actual practice I prefer to use salt concentrations in excess of two and one-half per cent, since an increase in salt concentration is accompanied by an increase in fungicidal powers of the solution.

A composition which is effective in the prophylaxis of athlete's foot can be prepared as follows: 2.5 parts by weight of para-nitrophenol are mixed with 97.5 parts by weight of sodium chloride, and one pound of this mixture dissolved in one gallon of water.

The following manner of use of the compositions in the prophylaxis of athlete's foot is given as illustrative: A solution prepared as described above, for example, the solution prepared as described in the preceding paragraph, is placed in a foot tub at the entrance of the shower room at a club. The person coming from the shower wets his or her feet with the solution by stepping into the tub containing the solution, and thereafter proceeds to dry and dress himself or herself in the usual manner.

The person skilled in the art will appreciate from the foregoing description that the concentration of the para-nitrophenol in the solutions described herein may be varied, and that it will be sufficient to use any para-nitrophenol concentration which, with the enhancement produced by the salt, will give the desired fungicidal or prophylactic powers to the solutions.

I claim:

1. A fungicidal composition comprising para-nitrophenol and a water soluble inorganic salt which is chemically non-reactive with said para-nitrophenol, said salt enhancing the fungicidal properties of said para-nitrophenol, the proportion of the said salt in the composition greatly exceeding the proportion of the para-nitrophenol in the composition.

2. A fungicidal composition comprising para-nitrophenol and sodium chloride, the proportion of sodium chloride therein greatly exceeding the proportion of para-nitrophenol.

3. A fungicidal composition for the prophylaxis of athlete's foot comprising para-nitrophenol, water and a water soluble inorganic salt which is chemically non-reactive with said para-nitrophenol, said salt enhancing the fungicidal properties of said para-nitrophenol, the said salt and water being present in the composition in such proportions as to produce an aqueous solution of said salt of at least two and one-half per cent concentration, and the proportion of said salt in the composition greatly exceeding the proportion of said para-nitrophenol.

4. A fungicidal composition for the prophylaxis of athlete's foot comprising para-nitrophenol, water and sodium chloride, in which the said sodium chloride and water are present in such proportions as to produce an aqueous solution of said sodium chloride of at least two and one-half per cent concentration, and in which the proportion of said sodium chloride greatly exceeds the proportion of said para-nitrophenol.

CLARENCE L. WEIRICH.